(No Model.)
A. ZOLLER.
HOP SEPARATOR.
No. 307,370. Patented Oct. 28, 1884.
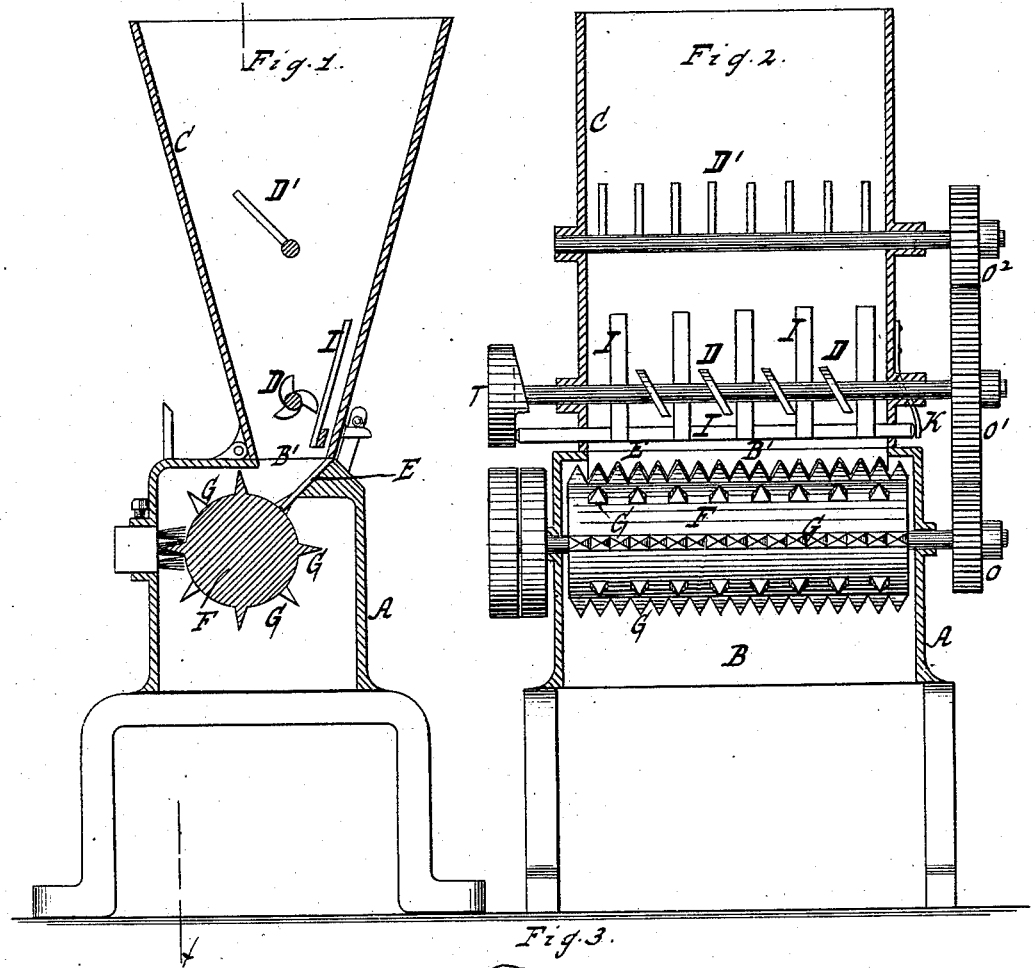
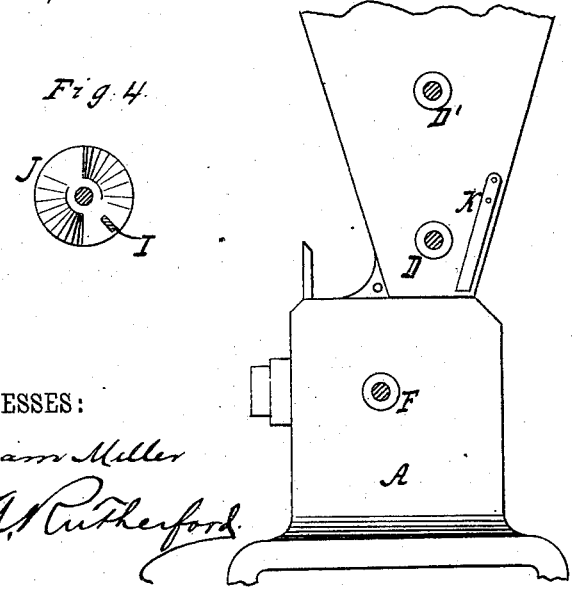
WITNESSES:
William Miller
J. A. Rutherford
INVENTOR
Albert Zoller
BY Van Santvoord & Hauff
ATTORNEYS

UNITED STATES PATENT OFFICE.

ALBERT ZOLLER, OF NEW YORK, N. Y.

HOP-SEPARATOR.

SPECIFICATION forming part of Letters Patent No. 307,370, dated October 28, 1884.

Application filed June 19, 1884. (No model.)

*To all whom it may concern:*

Be it known that I, ALBERT ZOLLER, a citizen of the United States, residing at New York, in the county and State of New York, have invented new and useful Improvements in Hop-Separators, of which the following is a specification.

This invention relates to that class of hop-separators for which I filed an application for Letters Patent April 24, 1884, Serial No. 129,167; and it consists in the novel arrangement, hereinafter described and claimed, of a reciprocating rake or agitator in the bottom of the hopper.

In the accompanying drawings, Figure 1 is a cross-section of an apparatus embodying my present invention. Fig. 2 is a longitudinal section thereof in the plane $x$ $x$, Fig. 1. Fig. 3 is a side view of the same. Fig. 4 is a detail view of parts.

Similar letters indicate corresponding parts.

The letter A designates the shell forming the separating-chamber B, and C the hopper communicating with the separating-chamber through the inlet-opening B' of the latter.

The letters D D' indicate revolving agitators, which are arranged in the hopper C, to disintegrate the mass of hops, and F denotes a revolving cylinder, which is arranged in the separating-chamber below its inlet-opening, the shafts of these agitators and the cylinder being geared together by means of cog-wheels O O' O².

The letter E designates a comb, which is adjustably arranged on an inclined plane in the inlet-opening of the separating-chamber, and G a series of teeth which are arranged on the revolving cylinder to alternate with the teeth of the comb, so that in the motion of the cylinder its teeth pass between the comb-teeth and act on the hops discharging from the hopper to separate the scale.

In the operation of this machine it has been found that the hops are liable to lodge in the bottom of the hopper, and especially on that side thereof meeting the comb, and to overcome this disadvantage a reciprocating rake, I, is arranged in the bottom of the hopper at a point adjacent to the side named, for the purpose of keeping the hops in motion, this rake extending through the ends of the hopper, as shown in Fig. 2, and its motion being produced by the joint action of a trip-wheel, J, and spring K, the wheel being mounted on the shaft of the agitator D to act on one end of the rake, while the spring is secured to the hopper to act on the other end thereof.

What I claim as new, and desire to secure by Letters Patent, is—

1. The combination, substantially as hereinbefore described, with the shell A, forming the separating-chamber, the inclined comb E, the revolving cylinder F, having teeth to alternate with the teeth of the comb, and the hopper C, of the reciprocating rake arranged in the bottom of the hopper at a point adjacent to the side meeting the comb, and a means for imparting motion to the rake.

2. The combination, substantially as hereinbefore described, with the shell A, forming the separating-chamber, the inclined comb E, the revolving cylinder F, having teeth to alternate with the teeth of the comb, the hopper C, and the agitator-shaft D, of the reciprocating rake arranged in the bottom of the hopper at a point adjacent to the side meeting the comb, the trip-wheel of the agitator-shaft acting on one end of the rake and the spring acting on the other end of the rake.

In testimony whereof I have hereunto set my hand and seal in the presence of two subscribing witnesses.

ALBERT ZOLLER. [L. S.]

Witnesses:
E. F. KASTENHUBER,
WILLIAM MILLER.